H. B. OSGOOD.
WEIGHING APPARATUS.
APPLICATION FILED SEPT. 17, 1907. RENEWED MAY 5, 1911.
1,012,270. Patented Dec. 19, 1911.
4 SHEETS—SHEET 1.
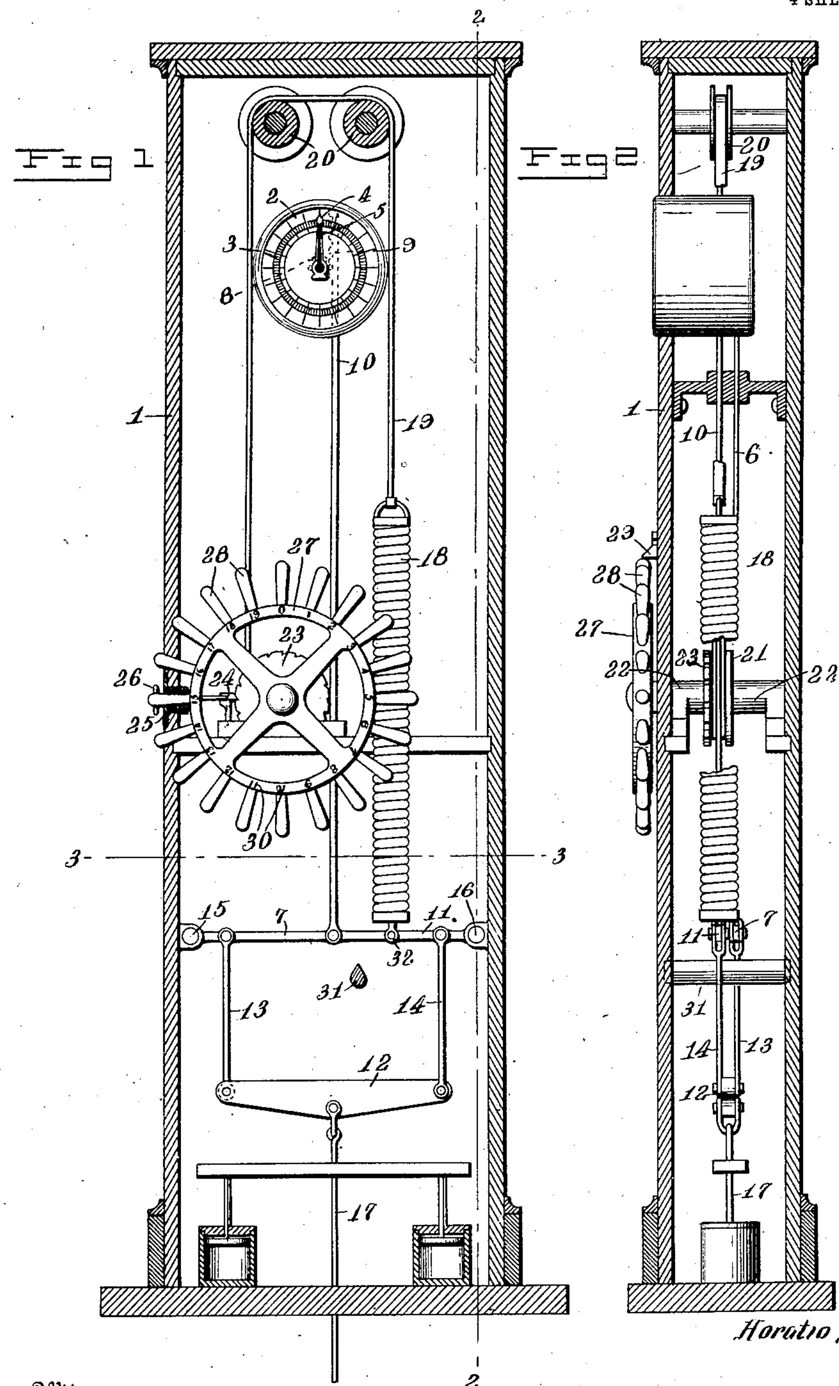
Inventor
Horatio Bonar Osgood
Witnesses
H. A. Robinette
E. A. Panabaker.
By
G. Ayres
Attorney
COLUMBIA PLANOGRAPH CO., WASHINGTON, D. C.

H. B. OSGOOD.
WEIGHING APPARATUS.
APPLICATION FILED SEPT. 17, 1907. RENEWED MAY 5, 1911.
1,012,270.
Patented Dec. 19, 1911.
4 SHEETS—SHEET 2.
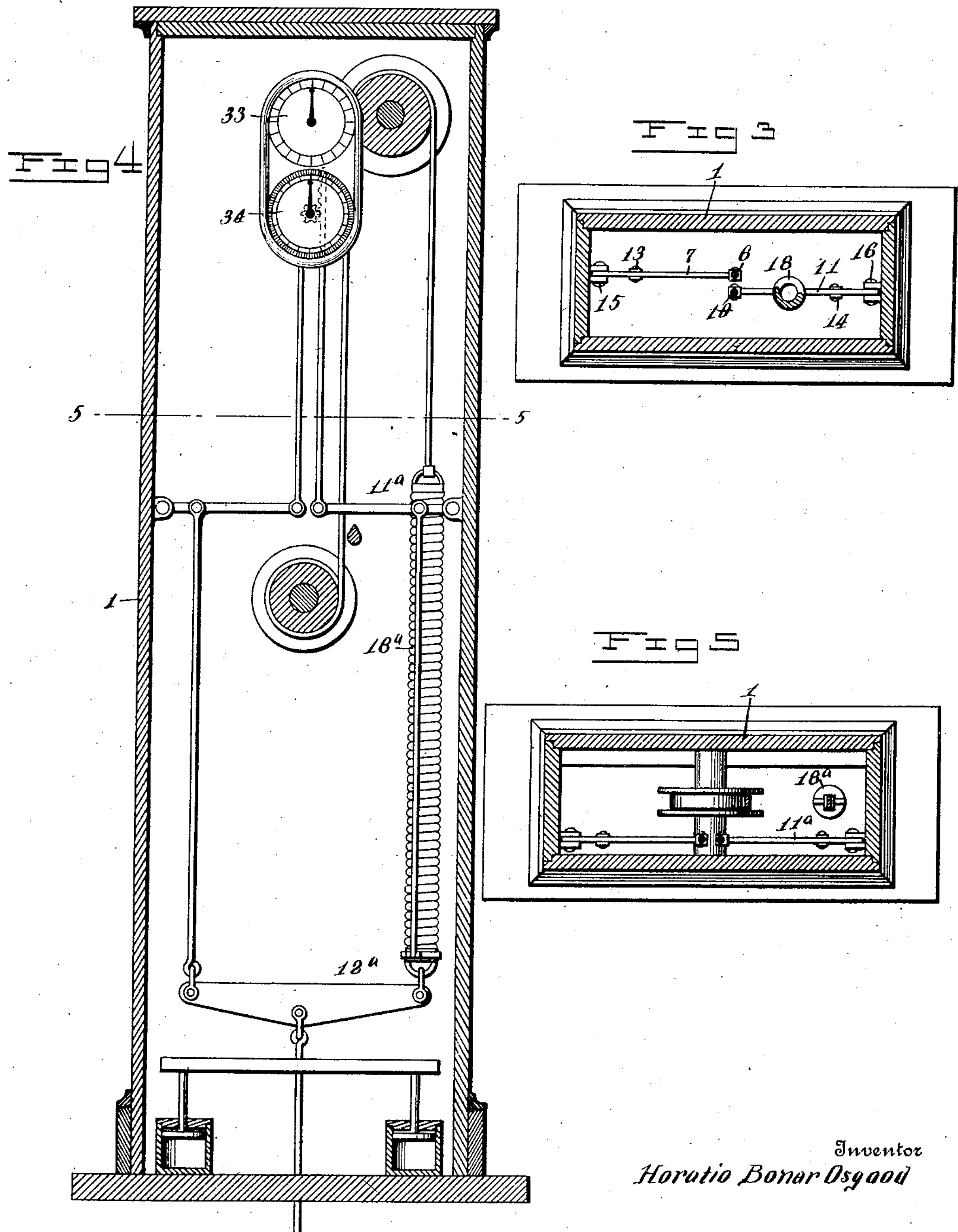
Inventor
Horatio Bonar Osgood
Witnesses
H. A. Robinette,
E. A. Vanobaker.
By G. Ayres
Attorney H. B. OSGOOD.
WEIGHING APPARATUS.
APPLICATION FILED SEPT. 17, 1907. RENEWED MAY 5, 1911.
1,012,270. Patented Dec. 19, 1911.
4 SHEETS—SHEET 3.
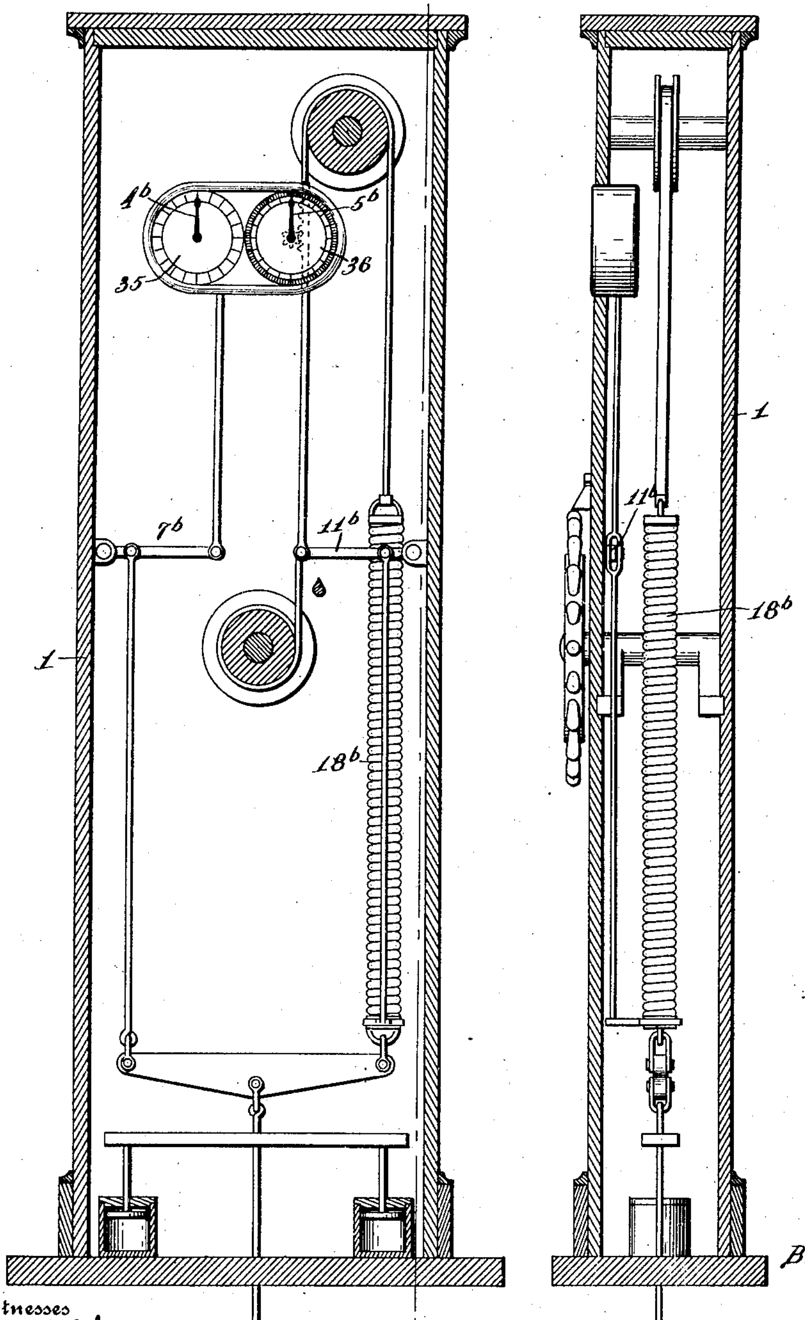
Witnesses
H. A. Robinette
E. A. Vansbaker
Inventor
Horatio
Bonar Osgood
By G. Ayres
Attorney
COLUMBIA PLANOGRAPH CO., WASHINGTON, D. C.

H. B. OSGOOD.
WEIGHING APPARATUS.
APPLICATION FILED SEPT. 17, 1907. RENEWED MAY 5, 1911.
1,012,270. Patented Dec. 19, 1911.
4 SHEETS—SHEET 4.
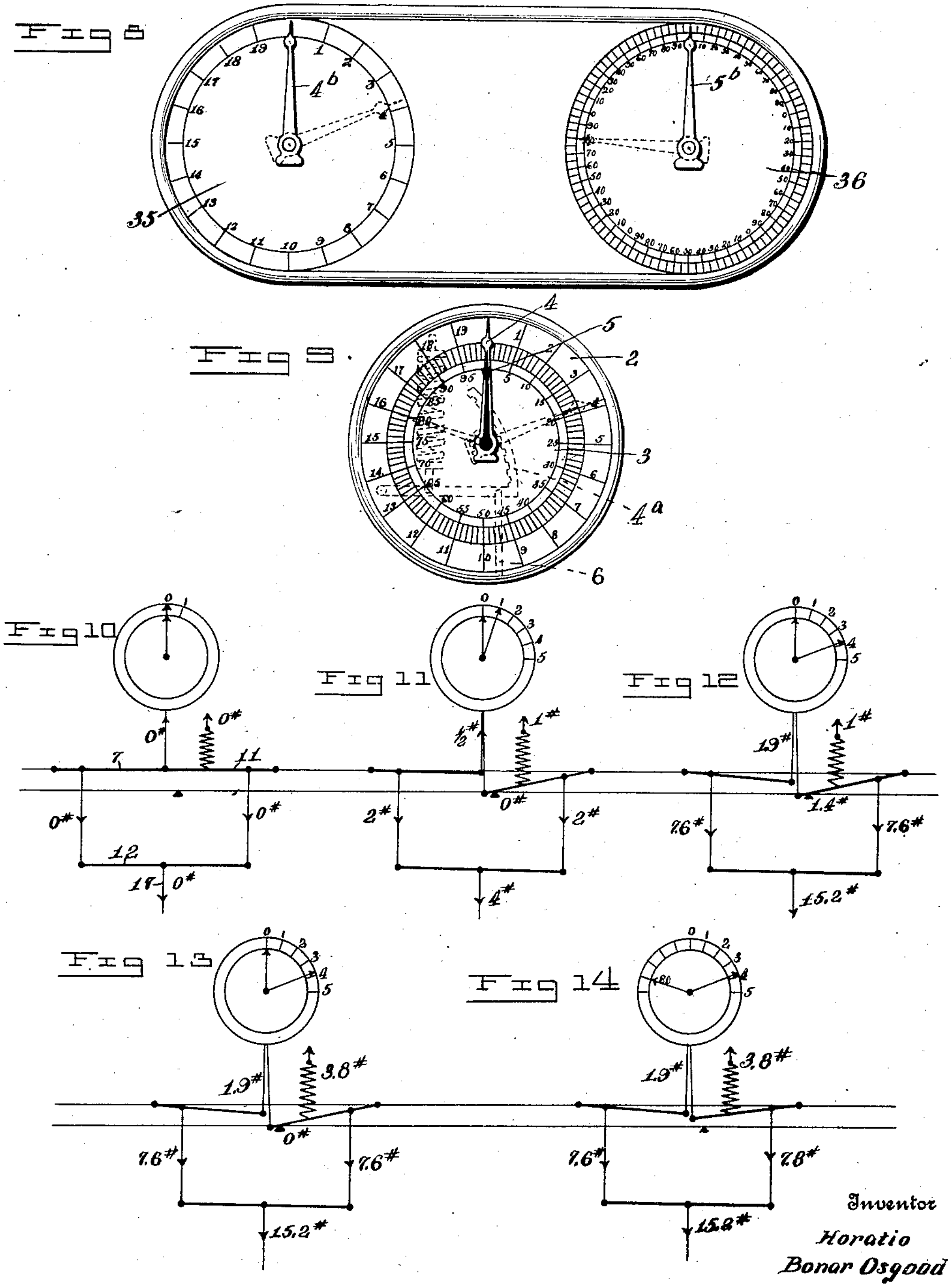
Inventor
Horatio Bonar Osgood
Witnesses
H. A. Robinette,
E. A. Panabakur
By G. Ayres
Attorney
COLUMBIA PLANOGRAPH CO., WASHINGTON, D. C.

UNITED STATES PATENT OFFICE.

HORATIO BONAR OSGOOD, OF BINGHAMTON, NEW YORK, ASSIGNOR TO OSGOOD SCALE COMPANY, OF BINGHAMTON, NEW YORK, A CORPORATION OF NEW YORK.

WEIGHING APPARATUS.

1,012,270. Specification of Letters Patent. Patented Dec. 19, 1911.

Application filed September 17, 1907, Serial No. 393,284. Renewed May 5, 1911. Serial No. 625,224.

*To all whom it may concern:*

Be it known that I, HORATIO BONAR OSGOOD, a citizen of the United States, residing at Binghamton, in the county of Broome and State of New York, have invented certain new and useful Improvements in Weighing Apparatus, of which the following is a specification.

My invention relates to improvements in weighing apparatus, and it consists in the constructions, combinations and arrangements herein described and claimed.

An object of my invention is to provide an improved scale constructed to operate with a minimum of friction, and in which any load throughout large ranges can be conveniently and quickly weighed without the necessity of handling weights or of adjusting a poise upon a graduated beam.

A further object of my invention is to provide an improved scale in which the weight of any load within the capacity of the scale will be accurately indicated.

In the accompanying drawings, forming a part of this application and in which similar reference symbols indicate corresponding parts in the several views—Figure 1 is a vertical sectional view of a scale casing, showing the several operating parts in elevation, illustrating one embodiment of my invention; Fig. 2 is a sectional view on the line 2—2 of Fig. 1; Fig. 3 is a sectional view on the line 3—3 of Fig. 1; Fig. 4 is a front elevation of a scale casing, partly broken away to show the operating parts, and illustrating a modified construction; Fig. 5 is a sectional view on the line 5—5 of Fig. 4; Fig. 6 is a vertical sectional view of a scale casing, showing the several operating parts in elevation, and illustrating a further modified construction; Fig. 7 is a sectional view on the line 7—7 of Fig. 6; Fig. 8 is a front elevation, on a larger scale, of the gages shown in Figs. 6 and 7; Fig. 9 is a front elevation of the gages shown in Figs. 1 and 2; and Figs. 10, 11, 12, 13, and 14 are a series of diagrammatical views illustrating the different positions of the gage pointers and their actuating means during the operation of weighing.

Referring especially to Figs. 1, 2, 3, 9 and 10 of the drawings, 1 indicates a vertical casing or housing in which are located an integer gage and an independent fractional gage. The indexes 2 of the integer gage and the indexes 3 of the fractional gage are shown arranged in concentric series on a common dial plate; the integer gage pointer 4 and fractional gage pointer 5 being mounted for rotation about a common axis at the center of said concentric series of indexes. The integer gage comprises any old type of spring gage provided with a gage pointer 4 and a spring balance construction $4^a$ in engagement therewith. The gage pointer 4 is actuated by a rod 6 connected to the spring construction $4^a$; the free end of said rod being shown pivoted to the end of a lever 7. A pinion 8 is secured on the spindle of the fractional gage pointer 5 in mesh with a rack 9 carried by a rod 10; said rod being pivotally connected to the free end of a lever 11. A traveling link 12 is pivotally connected by rods 13 and 14, respectively, to the levers 7 and 11 at a point adjacent the fixed fulcrums 15 and 16 of the latter. The medial portion of the traveling link 12 is connected by a scale rod 17 in the usual way to any well known arrangement of weighing levers. A spring 18 is pivotally secured at 32 to the lever 11, and has its upper end attached to a steel tape, or other flexible means, 19, which latter leads over suitable guide pulleys 20 and is secured to a manually operated drum 21 rotatably mounted in bearings 22 carried by the casing 1. A disk 23, secured to said drum, is provided with a series of notches corresponding in number to the number of divisions on the integer gage. A suitable spring dog 24 is normally maintained by a spring 25 in engagement with the notched wheel 23 for locking said wheel and its attached drum against rotation; a manually operated handle 26 being conveniently positioned for retracting the dog.

A hand wheel 27 is secured to the shaft of the drum 21 exterior to the front face of the casing 1; said hand wheel being provided with a series of peripheral extensions 28, which constitute convenient handles for rotating the wheel and also act as pointers cooperating with an index 29 fixed on the casing 1. The hand wheel is provided with a series of successively numbered indexes 30, corresponding in angular position and number to the notches in the disk 23.

A fixed stop 31 is carried by the casing 1 in position for engaging the lever 11 when the latter is swung downwardly a distance sufficient to cause one complete revolution of the pointer 5 of the fractional gage; said stop then acting to lock said lever and gage against further operation upon continued loading of the scale. The notches on the wheel 23 are so spaced that a rotation of the drum 21 through the angular distance between any two successive notches will wind or unwind a portion of the steel tape 19 equal to the travel of the pivotal connection 32 during swing of the lever 11 from its normal upper position into engagement with the fixed stop 31. In other words, a rotation of the drum 21 through the angular distance between any two consecutive numbered indexes on the hand wheel, will vary the tension of the spring 18 an amount exactly equal to the variation of tension produced in said spring by an initial scale loading equal to the capacity of the fractional gage.

In giving a detailed description of the operation of my invention, I will assume, for example, that the system of weighing levers employed transmit four pounds pull on the traveling link 12 for each one hundred pounds load on the scale platform, and that the rods 13 and 14 are connected to the levers 7 and 11 at a distance of one-fourth the length of the latter from their fixed fulcrums 15 and 16. The spring 18 is shown connected approximately at the middle of the lever 11, but all the above proportions can, obviously, be changed as desired. Such load pull of four pounds on the traveling link will exert a downward pull of two pounds on the rod 13, which will result in a pull of one-half pound on the rod 6, and swing the lever 7 downward sufficiently to move the integer gage pointer 4 through one division of said gage. Simultaneously, the load pull on the traveling link will swing the lever 11 downward against its fixed stop 31; thereby causing one complete revolution of the fractional gage pointer 5, and increasing the tension of the spring 18 one pound.

In the drawings, I have shown the integer gage provided with twenty index provisions of one hundred pounds each, and the fractional gage provided with unit-pound index divisions throughout its full capacity of one hundred pounds.

Fig. 10 illustrates the parts in their unloaded position; there being no load tension on the scale rod 17, and the gage pointers being at the zero marks of their dials. Fig. 11 illustrates the position of the parts when the scale platform has been loaded to the capacity of the fractional gage; in this instance 100 pounds. This loading has transmitted a tension of 4 pounds to the scale rod 17, which is distributed by the traveling link 12 to the levers 7 and 11. The downward pull thus produced will swing the lever 7 downwardly sufficiently to move the integer gage pointer 4 through one division, and to swing the lever 11 downward against the fixed stop 31 to cause one complete revolution of the fractional gage pointer 5 and increase the tension of the spring 18 one pound. Fig. 12 illustrates the position of the parts when the scale loading has been increased 280 pounds to complete the total loading of 380 pounds. This increased loading produces an increased tension of 11.2 pounds on the scale rod, making the total tension on said rod 15.2. The tension of 15.2 is distributed by the traveling link 12 to the levers 7 and 11; the lever 7 being swung down sufficiently to move the integer gage through 3.8 index divisions, and the lever 11 remaining stationary and being pressed against its fixed stop with a pressure of 1.4 pounds. The operator then turns the hand wheel 23 through a number of its indexes 30 corresponding to the highest index mark passed by the integer gage pointer; in this example, to bring the index 3 on the hand wheel in registry with the fixed index 29. During such rotation of the hand wheel through 2.8 of its index marks, the gage pointers and their connections will remain stationary. As indicated in Fig. 13, the only effect produced is to increase the tension of the spring 18 2.8 pounds, and thereby entirely relieve the lever 11 from all pressure against its fixed stop 31; the total tension of spring 18 being now 3.8 pounds, and the forces on the other connections remaining the same as in Fig. 12. The rotation of the hand wheel through the final .2 of its index marks will tend to extend the spring 18 and increase its tension. However, since the forces on the lever 11 are in equilibrium prior to rotation of the hand wheel through the final .2 of its index marks, such final movement of the hand wheel will elevate the lever 11 from its fixed stop 31 through .2 of its full upward travel to normal position. This upward swing of the lever 11 through .2 of its travel produces a reverse movement of the fractional gage pointer 5 through .2 of its complete revolution; said pointer then resting at its index mark indicating 80 pounds. The position of the parts is then as indicated in Fig. 14 and the total weight of the scale loading is accurately indicated by the gage pointers.

The example selected for the above illustration is, of course, arbitrary, and it will be clear that the principle and operation described would apply for any extent of loading, within the capacity of the scale and for any desired arrangement of indexes on the integer and fractional gages.

Figs. 4 and 5 illustrate a modification in which the manually adjustable spring 18[a]

is secured at its lower end to the traveling link $12^a$ and the integer gage 33 is arranged vertically above the fractional gage 34. This construction differs from that illustrated in Figs. 1 and 2 in attaching the spring $18^a$ to the traveling link instead of to the lever $11^a$, and the operation is similar to that above described.

Figs. 6, 7 and 8 illustrate the construction shown in Figs. 4 and 5, with the integer gage 35 and fractional gage 36 arranged side by side; the levers $11^b$ and $7^b$ being shortened to accommodate such position of the gages. In this construction, I have shown the fractional gage having a capacity equal to five of the index divisions of the integer gage. This arrangement is rendered especially advantageous for freight scales by arranging each index of the integer scale to indicate 100 pounds, and providing the fractional gage with five successively arranged duplicate series of index marks, each of said series of marks being indexed from zero to one hundred pounds. The combination of gages with a plurality of successively arranged duplicate series of index marks on the fractional gage enables said gage to be closely indexed without producing a crowding or confusion of the index numbers thereon; thereby insuring a ready and accurate reading of the gages. With such arrangement, all loads up to 500 pounds can be read directly from the gages without the necessity of adjusting the manually-operated spring $18^b$. Thus, with a scale loading of 380 pounds the integer gage pointer $4^b$ will be shifted between the third and fourth index marks and the fractional gage pointer $5^b$ will be rotated past three of the series of index marks and rest at the index mark indicating 80 pounds on the fourth of said series. A total load reading of 380 pounds would be given as indicated in broken lines in Fig. 8.

In the several above described constructions, the two gages are operated by independent levers interposed in the connections between said gages and the traveling link. These levers constitute independent reducing mechanisms to minimize the necessary movement of the traveling link for actuating the gages, and thereby insure accurate adjustment of the gages in the various slightly inclined positions assumed by the traveling link under different loads within the scale capacity. In the preferred construction, shown in Figs. 1 and 2 of the drawings, the reducing levers have the additional advantage of reducing the tension required in the manually-adjustable spring during the weighing operation.

I have illustrated and described preferred and satisfactory constructions, but, obviously, changes could be made within the scope of my invention.

Having thus described my invention what I claim as new therein and desire to secure by Letters Patent is:—

1. In a scale, the combination of a plurality of gages, reducing mechanisms for operating said several gages, a common means for actuating said reducing mechanisms, yielding means for controlling such actuation of one of said reducing mechanisms, and means for limiting the operation of one of said gages at a predetermined loading of the scale, substantially as described.

2. In a scale, the combination of a pair of gages, an independent reducing mechanism for operating each of said gages, a common means for actuating said reducing mechanisms during initial loading of the scale, yielding means for controlling such actuation of one of said reducing mechanisms, and means for automatically limiting the operation of one of said gages at a predetermined loading of the scale, substantially as described.

3. In a scale, the combination of a pair of gages, an independent reducing mechanism for operating each of said gages, a common means for actuating said reducing mechanisms during initial loading of the scale, yielding means for controlling such actuation of one of said reducing mechanisms, and means for automatically locking one of said reducing mechanisms from further actuation upon a predetermined loading of the scale, substantially as described.

4. In a scale, the combination of a pair of gages, an independent lever for operating each of said gages, a common means for actuating said levers during initial loading of the scale, yielding means for controlling such actuation of one of said levers, and means for automatically locking one of said levers from further actuation upon a predetermined loading of the scale, substantially as described.

5. In a scale, the combination of a pair of gages, an independent reducing mechanism for operating each of said gages, a common shiftable member, connections between said shiftable member and said reducing mechanisms for actuating one of the latter during loading of the scale throughout its full capacity, and means for shifting the other of said reducing mechanisms at any load within the capacity of the scale, substantially as described.

6. In a scale, the combination of a pair of gages, an independent reducing mechanism for operating each of said gages, a common shiftable member, connections between said shiftable member and said reducing mechanisms for actuating one of the latter during loading of the scale throughout its full capacity, manually-operated means for shifting the other of said reducing mechanisms at any load within the capacity of the scale, and means for indicating the extent of movement of said manually-operated means, substantially as described.

7. In a scale, the combination of an integer gage, a fractional gage, an independent lever for operating each of said gages, a common means for actuating said levers during initial loading of the scale throughout the capacity of said fractional gage, means for automatically locking the lever of said fractional gage from operation during further loading of the scale, and manually-operated means for shifting said lever of the fractional gage to shift said lever at any load within the capacity of the scale, substantially as described.

8. In a scale, the combination of a gage having a capacity less than that of the scale, a lever for operating said gage, a traveling link for actuating said lever during loading of the scale throughout the capacity of said gage, and manually-operated means for shifting said lever at any load within the capacity of the scale, and means for indicating the extent of movement of said manually-operated means, substantially as described.

9. In a scale, the combination of an integer gage provided with index divisions numbered consecutively from zero to the capacity of said gage, a fractional gage having a plurality of successively arranged duplicate series of index marks, the several duplicate series of index marks being provided with a series of numerals for indicating fractional parts of one of the index divisions of said integer gage, a common means for actuating said gages during loading of the scale, and means for limiting the operation of said fractional gage at a scale loading corresponding to the capacity of said gage, substantially as described.

In testimony whereof I affix my signature in presence of two witnesses.

HORATIO BONAR OSGOOD.

Witnesses:

S. MACK SMITH,
JOSEPH S. O'NEIL.

Copies of this patent may be obtained for five cents each, by addressing the "Commissioner of Patents, Washington, D. C."